(12) United States Patent
Beers et al.

(10) Patent No.: US 7,990,889 B2
(45) Date of Patent: Aug. 2, 2011

(54) SYSTEMS AND METHODS FOR MANAGING VIRTUAL COLLABORATION SYSTEMS

(75) Inventors: Ted Beers, Corvallis, OR (US); Mike Derocher, Albany, OR (US); Brad Allen, Salem, OR (US); Jon A Brewster, Monmouth, OR (US); Mark E Gorzynski, Corvallis, OR (US); Scott Grasley, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 11/917,678

(22) PCT Filed: Oct. 1, 2007

(86) PCT No.: PCT/US2007/080100
§ 371 (c)(1),
(2), (4) Date: Sep. 26, 2008

(87) PCT Pub. No.: WO2009/045207
PCT Pub. Date: Apr. 9, 2009

(65) Prior Publication Data
US 2009/0323552 A1    Dec. 31, 2009

(51) Int. Cl.
*H04L 12/28* (2006.01)
(52) U.S. Cl. ........ 370/254; 370/260; 370/261; 370/329; 709/223; 709/204; 709/245
(58) Field of Classification Search .................. 370/260, 370/329; 707/10; 395/200.3
See application file for complete search history.

(56) References Cited

U.S. PATENT DOCUMENTS

| | | | |
|---|---|---|---|
| 5,491,797 A * | 2/1996 | Thompson et al. | 709/204 |
| 5,999,966 A | 12/1999 | McDougall et al. | |
| 6,545,700 B1 | 4/2003 | Monroe | |
| 7,689,568 B2 * | 3/2010 | Lee et al. | 370/401 |
| 2004/0267938 A1 | 12/2004 | Shoroff et al. | |
| 2005/0021620 A1 * | 1/2005 | Simon et al. | 709/204 |

(Continued)

FOREIGN PATENT DOCUMENTS
DE          10104253 A1    12/2002
(Continued)

OTHER PUBLICATIONS

Ho J-M et al :"A conference gateway supporting interoperability between SIP and H.323" Proceedings of the 9th ACM international Conference on Multimedia.Ottawa,Canada.

*Primary Examiner* — Robert W Wilson
*Assistant Examiner* — Mohamed Kamara

(57) ABSTRACT

Systems and methods for managing virtual collaboration systems are disclosed herein. A virtual collaboration system includes a distributor communicatively coupled to a first network and a second network having different network characteristics from the first network, the distributor configured to receive first media streams from at least one first network node, and to transmit the first media streams to at least one second network node; and a management subsystem adapted to dynamically configure a topology of a virtual collaborative event, wherein configuration of the topology includes a determination of media stream connections among the distributor and the at least one first network node based, at least in part, on at least one policy, and wherein the media stream connections establish and maintain virtual relationships among the at least one first network node and the at least one second network node.

24 Claims, 9 Drawing Sheets

U.S. PATENT DOCUMENTS

| | | |
|---|---|---|
| 2005/0122392 A1 | 6/2005 | Johansen et al. |
| 2005/0144233 A1 | 6/2005 | Kjesbu et al. |
| 2006/0187859 A1* | 8/2006 | Shaffer et al. ................. 370/260 |
| 2007/0086366 A1* | 4/2007 | Luo et al. ..................... 370/260 |
| 2007/0093238 A1 | 4/2007 | Lin |

FOREIGN PATENT DOCUMENTS

| | | |
|---|---|---|
| EP | 1388997 A | 2/2004 |
| WO | WO98/57485 A | 12/1998 |
| WO | WO2006/043061 A | 4/2006 |

* cited by examiner

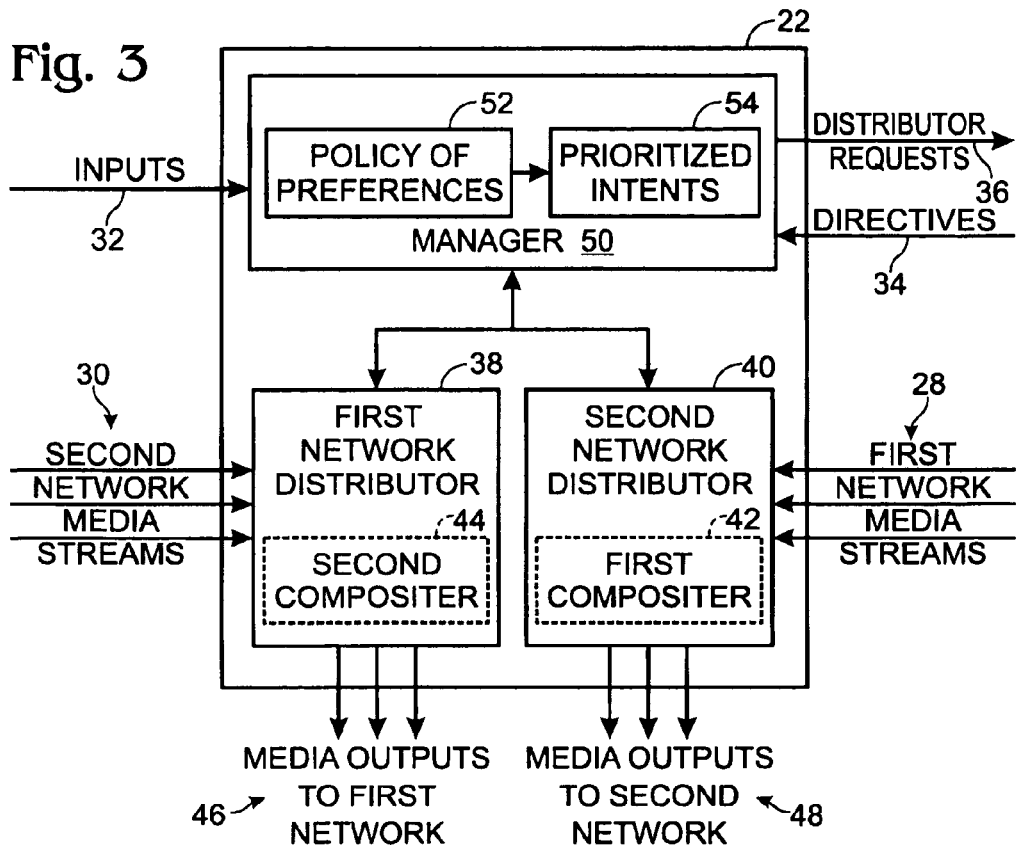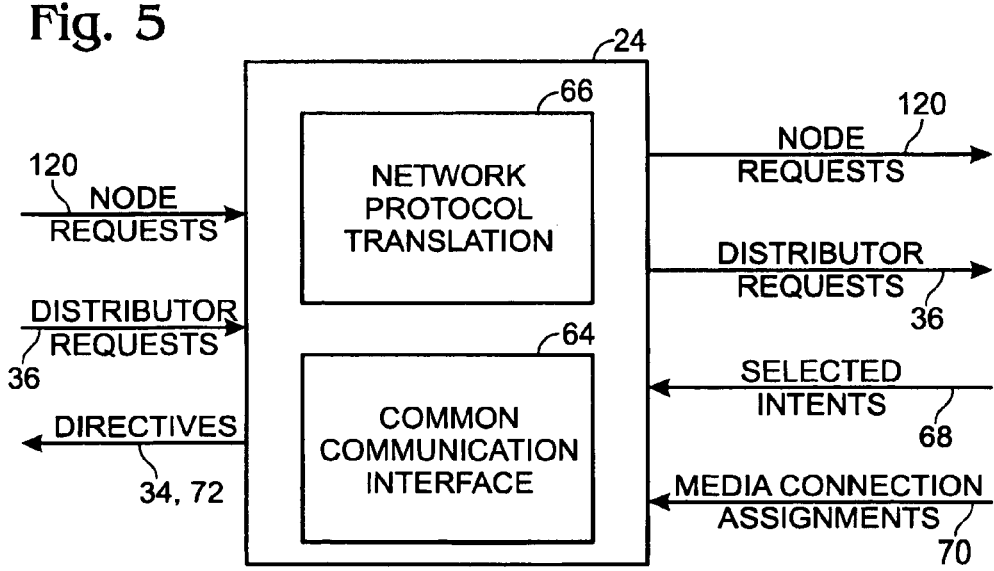

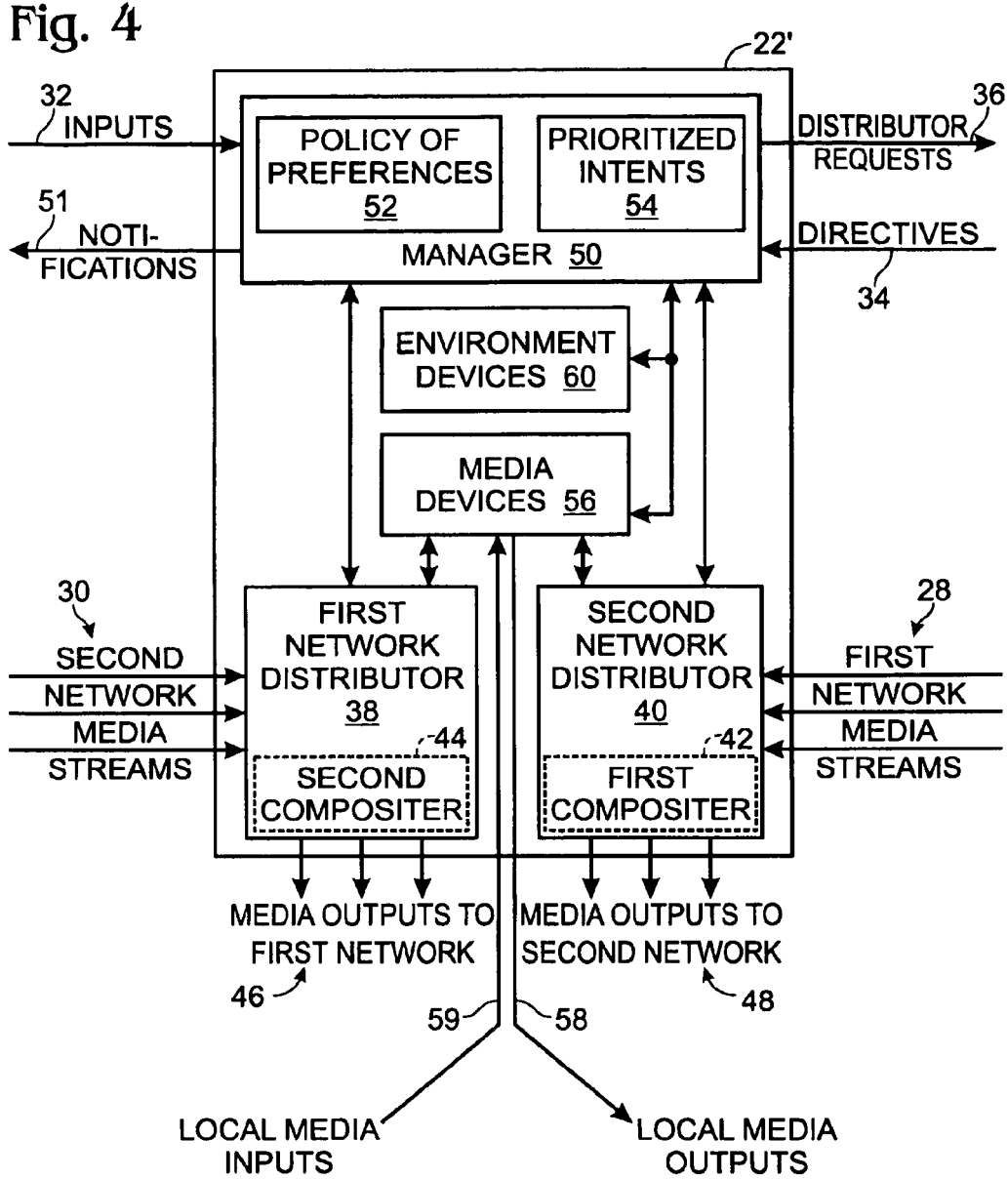

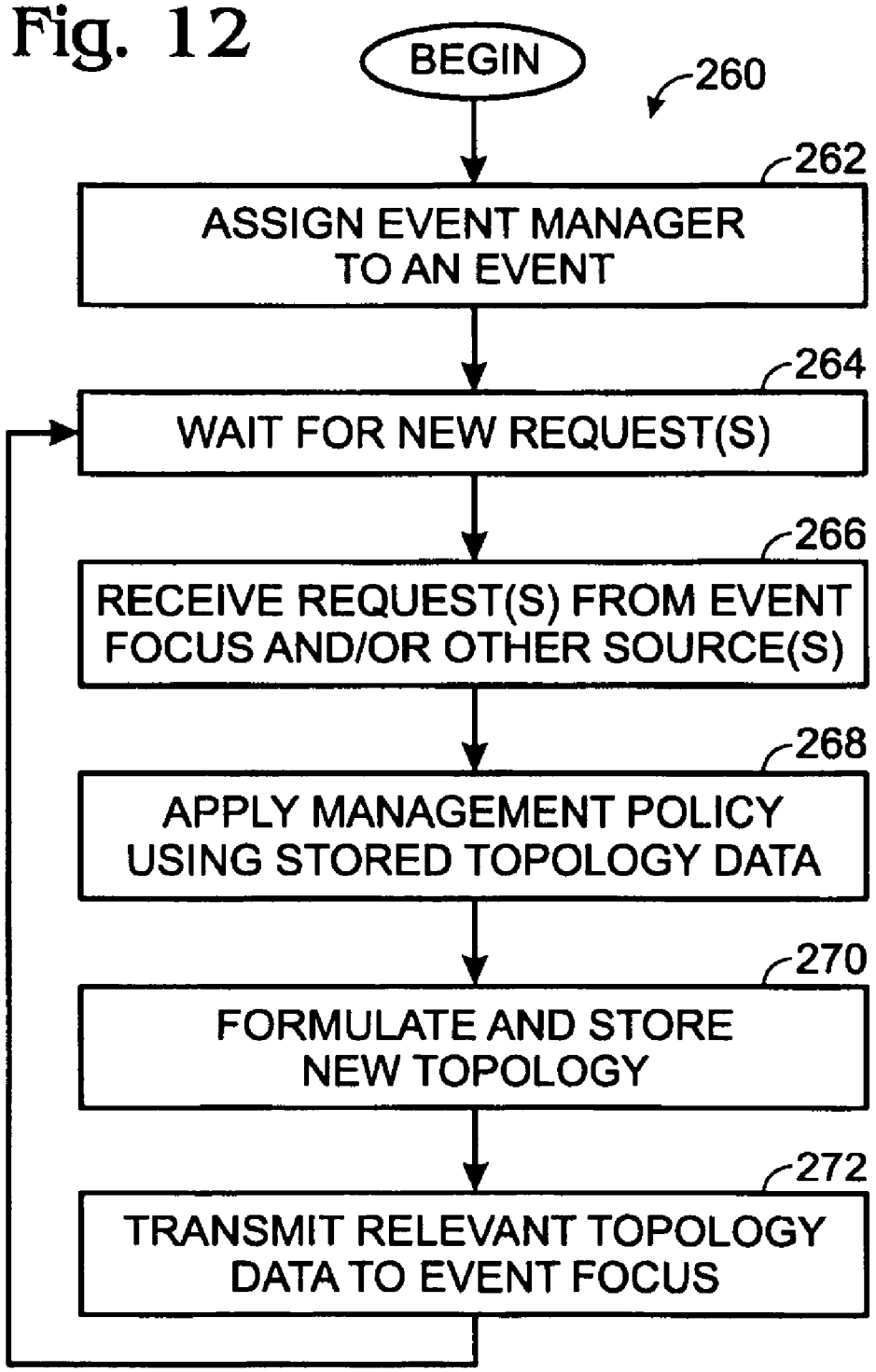

SYSTEMS AND METHODS FOR MANAGING VIRTUAL COLLABORATION SYSTEMS

BACKGROUND

Videoconferencing and other forms of virtual collaboration allow the real-time exchange of video, audio, and/or other data among systems in remote locations. That real-time exchange of data often occurs over a computer network in the form of streaming video and/or audio data. Many systems can establish media streams at the beginning of an event, but cannot transition smoothly to new configurations as various systems enter and/or leave an event.

Additionally, numerous methods have been devised to connect systems with identical or substantially compatible capabilities. However, managing events involving systems with differing capabilities and/or systems connected to different networks is substantially more difficult. For example, few existing methods for event configuration adequately negotiate media connections among heterogeneous systems and/or heterogeneous networks. Those systems that require user input to establish connections detract from the collaborative experience. Other systems may establish connections automatically, but base media support on sometimes erroneous assumptions of the capabilities of participating systems.

One established protocol, Session Initiation Protocol (SIP), allows systems to negotiate media connections among multiple devices. However, SIP does not consider the relationships among media streams in order to maintain virtual relationships among participants. Moreover, SIP does not communicate the availability of advanced capabilities that would support optimal media connections. Current virtual collaboration systems do not adequately support systems with varying levels of functionality and/or allow dynamic reconfiguration of participating systems without interruption of an event in progress. They also lack support for the establishment of consistent virtual relationships among participating systems, such as participating systems that have different capabilities and/or that are connected to different networks.

BRIEF DESCRIPTION OF THE DRAWINGS

The accompanying drawings illustrate various examples of the present systems and methods and are a part of the disclosure. The illustrated examples are merely examples of the present systems and methods and do not limit the scope of the disclosure.

FIG. 3 is a block diagram of a distributor, according to some embodiments.

FIG. 4 is a block diagram of a distributor, according to other embodiments.

FIG. 5 is a block diagram of an event focus, according to some embodiments.

FIG. 12 is a flow chart of a method of operation of an event manager, according to some embodiments.

Throughout the drawings, identical reference numbers may designate similar, but not necessarily identical, elements.

DETAILED DESCRIPTION

Figure 1:
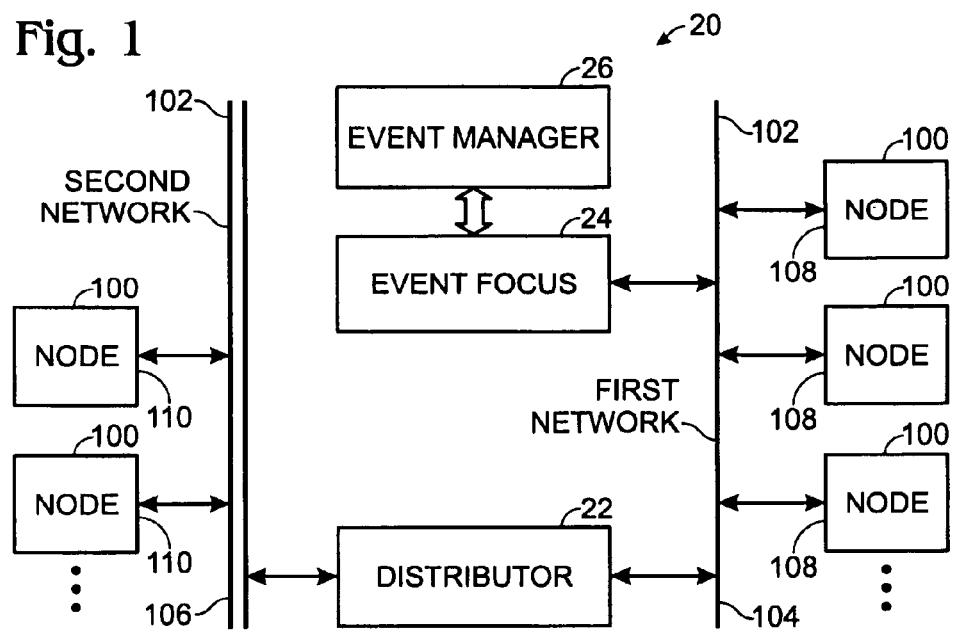
FIG. 1 is a block diagram of an event manager system, according to some embodiments.

The present illustrative methods and systems may be adapted to manage the configuration of virtual collaboration systems, such as virtual collaboration systems that involve nodes that have different capabilities and/or that are connected to different networks. Specifically, the present illustrative systems and methods may, among other things, intrinsically consider the relationships among related media streams, manage and maintain the virtual relationships among nodes to optimize the directives to the nodes to support a new topology, and/or support a variety of proprietary and industry-standard communications mechanisms while managing one or more of the nodes equivalently in the event itself. Further details of the present illustrative virtual collaboration systems and methods will be provided below.

As used in the present disclosure and in the appended claims, the term "media" is defined to include text, video, sound, images, data, and/or any other information that may be transmitted over a computer network.

Additionally, as used in the present disclosure and in the appended claims, the term "node" is defined to include any system with one or more components configured to receive, present, and/or transmit media with a remote system directly and/or through a network. Suitable node systems may include videoconferencing studio(s), computer system(s), notebook computer(s), telephone(s), personal digital assistant(s) (PDAs), or any combination of the previously mentioned or similar devices.

Similarly, as used in the present disclosure and in the appended claims, the term "event" is defined to include any designated time and/or virtual meeting place providing systems a framework to exchange information. An event allows at least one node to transmit and receive media information and/or media streams. According to some embodiments, the event exists separate and distinct from nodes participating in collaboration. Further, an event may exist while nodes are exchanging information and also may exist while no nodes are participating, such as before any nodes have joined an event. An event also may be referred to as a "session."

Further, as used in the present disclosure and in the appended claims, the term "topology" is defined to include each system associated with an event and its respective configuration, state, and/or relationship to other systems associated with the event. A topology may include node(s), distributor(s), event focus(es), event manager(s), virtual relationships among nodes, mode of participation of the node(s) and/or the distributor(s), and/or media streams associated with the event.

Moreover, as used in the present illustrative disclosure, the terms "subsystem" and "module" may be used interchangeably to include any number of hardware, software, firmware components, or any combination thereof. As used in the present disclosure, the subsystems and modules may be a part of and/or hosted by one or more computing devices, including server(s), personal computer(s), personal digital assistant(s), and/or any other processor containing apparatus. Various subsystems and modules may perform differing functions and/or roles and together may remain a single unit, program, device, and/or system.

In the following description, numerous specific details are set forth in order to provide a thorough understanding of the present systems and methods. It will be apparent, however, to one skilled in the art that the present systems and methods may be practiced without these specific details. Reference in the disclosure to "one example" or "an example" means that a particular feature, structure, and/or characteristic described in connection with the example is included in at least one example. The appearance of the phrase "in one example" in various places in the disclosure are not necessarily all referring to the same example.

FIG. 1 shows a management subsystem or an event manager system 20, according to some embodiments. As used herein, and in the appended claims the terms "management subsystem" and "event manager system" may be used interchangeably. Event manager system 20 may include any suitable structure used to provide and/or manage one or more collaborative "cross-connected" events among nodes 100 communicatively coupled to the event manager system via two or more communication networks 102. For example, the event manager system may include a distributor 22, an event focus 24, and an event manager 26.

As illustrated in FIG. 1, collaborative event participating subsystems or nodes 100 may be communicatively coupled to event manager system 20 via networks 102, such as first network 104 and/or second network 106. Nodes 100 may include one or more first network nodes 108 and one or more second network nodes 110. First network nodes 108 may be communicatively coupled to the first network. Second network nodes 110 may be communicatively coupled to the second network. Although three first network nodes 108 and two second network nodes 110 are shown, any suitable number of first network and/or second network nodes may be communicatively coupled to the event manager system.

First network 104 may be a single data network or may include any number of communicatively coupled networks. Similarly, second network 106 may be a single data network or may include any number of communicatively coupled networks. Particularly, according to some embodiments, first network 104 and/or second network 106 may include different types of networks, such as local area network(s) (LANs), wide area network(s) (WANs), metropolitan area network(s), wireless network(s), virtual private network(s) (VPNs), Ethernet network(s), token ring network(s), public switched telephone network(s) (PSTNs), general switched telephone network(s) (GSTNs), switched circuit network(s) (SCNs), integrated services digital network(s) (ISDNs), and/or proprietary network(s). In some embodiments, second network 106 may have a different network type from first network 104. For example, the first network may be a virtual private network, while the second network may be at least one of a PSTN and an ISDN.

Additionally, according to some embodiments, first network 104 and/or second network 106 also may employ any suitable network protocol for the transport of data including transmission control protocol/internet protocol (TCP/IP), hypertext transfer protocol (HTTP), file transfer protocol (FTP), T.120, Q.931, stream control transmission protocol (SCTP), multi-protocol label switching (MPLS), point-to-point protocol (PPP), real-time protocol (RTP), real-time control protocol (RTCP), real-time streaming protocol (RTSP), and/or user datagram protocol (UDP).

Additionally, according to some embodiments, first network 104 and/or second network 106 also may employ any suitable call signaling protocols or connection management protocols, such as Session Initiation Protocol (SIP) and H.323. The network type, network protocols, and the connection management protocols may collectively be referred to as "network characteristics." Any suitable combination of network characteristics may be used, particularly when there are two or more networks, such as the first and second networks, connected to the event manager system. The second network may be referred as having "different network characteristics" from the first network if those networks differ in network type, network protocol, and/or connection management protocol.

Use of the various network protocols and/or connection management protocols may be harmonized by event focus 24, which may translate data to and/or from a protocol preferred by event manager 26, as further described below. Alternatively, or additionally, distributor 22 may convert network protocol(s) and/or connection management protocol(s) to harmonize the various network protocols used by the first and second networks.

Figure 2:
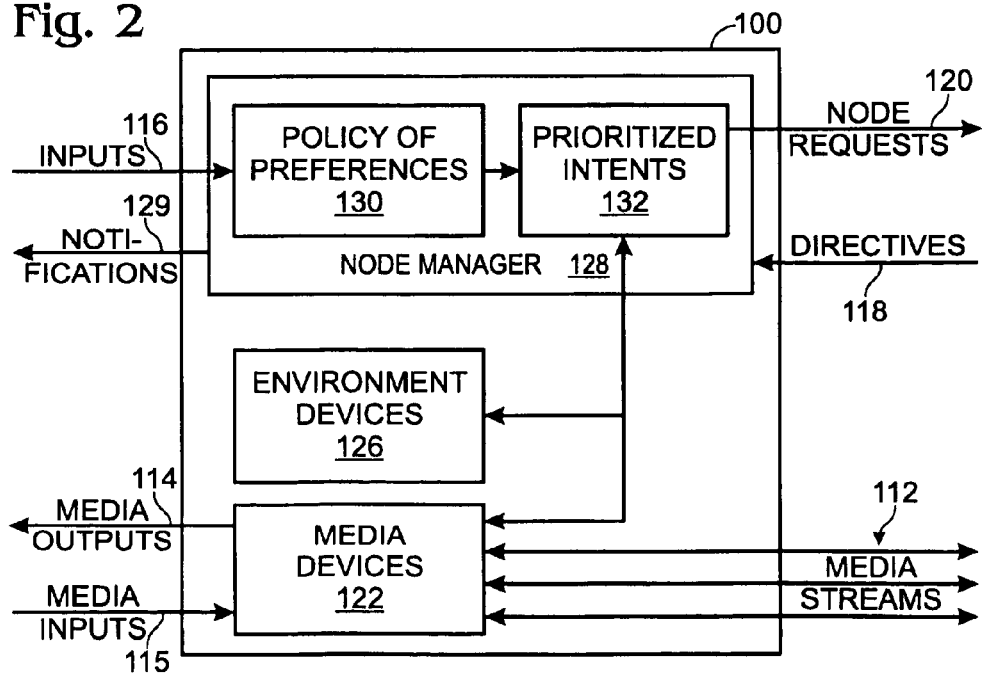
FIG. 2 is a block diagram of a node, according to some embodiments.

FIG. 2 shows components of node 100, as well as connections of the node to event management system 20, according to some embodiments. As generally illustrated, node 100 is a system that may participate in a collaborative event by receiving, presenting, and/or transmitting media data. Accordingly, node 100 may be configured to receive and/or transmit media information or media streams 112, to generate local media outputs 114, to receive attendee inputs 116 and/or system directives 118, and/or to transmit node requests 120. The physical form of node 100 may vary greatly in capability, and may include telephone(s), personal digital assistant(s) (PDAs), laptop(s), computer system(s), video conferencing studio(s), and/or any other system capable of connecting to and/or transmitting data over a network. One or more of nodes 100 that are participating in an event may be referenced during the event through a unique identifier. That identifier may be intrinsic to the system, connection dependent such as IP address or telephone number, assigned by the event manager based on event properties, and/or decided by another policy asserted by the system.

As shown, node 100 may include any suitable number of media devices 122, which may include any suitable structure configured to receive media streams 112, display and/or present the received media streams (such as media output 114), generate or form media streams 112 (such as from media inputs 115), and/or transmit the generated media streams. In some embodiments, media streams 112 may be received from and/or transmitted to other nodes 100 and/or distributor 22. According to some embodiments, node 100 may be in the form of a telephone, which may include a speaker and a microphone as media devices 122. Alternatively, or additionally, the media devices may include microphone(s), camera(s), video screen(s), keyboard(s), scanner(s), and/or other input and/or output device(s).

Media device 122 may comprise any hardware and/or software element(s) capable of interfacing with one or more other nodes 100, the distributor, and/or one or more networks 102. One or more of the media devices may be configured to receive media streams 112, and/or to reproduce and/or present the received media streams in a manner discernable to an attendee. Node 100 also may include one or more environment devices 126, which may include any suitable structure configured to adjust the environment of the node and/or support one or more functions of one or more other nodes 100 and/or the distributor. The environment devices may include participation capabilities not directly related to media stream connections. For example, environment devices 126 may change zoom setting(s) of one or more cameras, and/or may adjust lighting.

According to some embodiments, media devices 122 may be communicatively coupled to various possible media streams 112. Any number of media streams 112 may be connected to the media devices, according to the event topology and/or node capabilities. The coupled media streams may be heterogeneous and/or may include media of different types. According to some embodiments, the node may simultaneously transmit and/or receive media streams 112 comprising audio data only, video and audio, video and audio from a specified camera position, and/or collaboration data from a computer display to different nodes participating in an event.

Media streams 112 connected across two or more networks 102 may exchange data in a variety of formats. The media streams or media information transmitted and/or received may conform to coding and decoding standards including G.711, H.261, H.263, H.264, G.723, common intermediate format (CIF), and/or proprietary standard(s). Additionally, or alternatively, any suitable computer-readable file format may be transmitted to facilitate the exchange of text, sound, video, data, and/or other media types.

As shown in FIG. 2, node 100 also may include a node manager 128, which may include any suitable structure adapted to process attendee input(s) 116 and/or other system directive(s) 118, and to configure one or more of the various media devices 122 based, at least in part, on the received directives 118. In some embodiments, the node manager may interpret directives received from the event focus and generate, for example, device-specific directives for its media and/or environment devices based, at least in part, on the received directives. Configuration of the media devices and/or the level of participation may be varied by the capabilities of the node and/or variations in the desires of attendees, such as provided by the attendee input(s). The node manager also may send notifications 129 that may inform users and/or attendees of the configuration of the media devices, other nodes in the event and/or attempting to connect to the event, etc.

The various modes of participation may be termed intents, and may include n-way audio and video exchange, audio exchange only, audio and high-resolution video, audio and low-resolution video, dynamically selected video display, audio and graphic display of collaboration data, audio and video receipt without transmission, and/or any other combination of media input and/or output. The intent of a node may be further defined to include actual and/or desirable relationships present among media devices 122, media streams 112, and other nodes 100, which may be in addition to the specific combination of features and/or media devices 122 already activated to receive and/or transmit the media streams. Additionally, or alternatively, the intent of a node may include aspects that influence environment considerations. For example, the number of seats to show in an event, which may, for example, impact zoom setting(s) of one or more cameras.

As shown in FIG. 2, the node manager may include a pre-configured policy of preferences 130 within the node manager that may create a set of prioritized intents 132 from the possible modes of participation for the node during a particular event. The prioritized intents may change from event to event and/or during an event. For example, the prioritized intents may change when a node attempts to join an event, leave an event, participate in a different manner, and/or when directed by the attendee.

As node 100 modifies its prioritized intents 132, node request 120 may be sent to the event manager system. In some embodiments, node requests 120 may be sent to the event focus and/or the distributor. In one example, the node request may comprise one or more acts of connection, such as dialing a telephone number. In another example, the node request may include the prioritized intents and information about the capabilities of the node transmitting the node request. The node type, which may indicate capabilities of the node and/or relationships among the media devices, is an example of information about capabilities, and may be summarized by a token. For example, the token may be "B2B6," which may imply "three displays, three cameras, three microphones, one speaker system." Additionally, or alternatively, the node type and/or associated token may indicate relationships among media devices 122, such as the positioning of three displays to the left, right, and center relative to an attendee.

A node may not automatically send the same information about its capabilities and relationships in every situation. Node 100 may repeatedly select and/or alter the description of capabilities and/or relationships to disclose. For example, if node 100 includes three displays but the center display may be broken or in use, the node may transmit information representing only two displays, one to the right and one to the left of an attendee. Thus, the information about a node's capabilities and relationships that event manager may receive may be indicated through the node type and/or the node's prioritized intents 132. The node request may additionally, or alternatively, comprise a form of node identification. Although particular components are shown for node 100, one or more of the nodes may alternatively, or additionally, include one or more other components.

FIG. 3 shows components of distributor 22, as well as connections of the distributor to nodes 100, such as first network nodes 108 and/or second network nodes 110, and to event focus 24 and/or event manager 26. As generally illustrated, distributor 22 is a system that may be communicatively coupled to network(s) 102, such as first network 104 and/or second network 106, and may be configured to participate in a collaborative event by transmitting and/or receiving media stream(s) and/or data. Accordingly, distributor 22 may receive, present, and/or transmit media information or media streams. For example, distributor 22 may be configured to receive first media streams 28 from at least one node communicatively coupled to first network 104, and/or to transmit the received first media streams to at least one node communicatively coupled to second network 106. Distributor 22 may additionally, or alternatively, be configured to receive second media streams 30 from at least one second network node, and/or to transmit the received second media streams to the at least one first network node.

Additionally, or alternatively, distributor 22 may be configured to receive inputs 32 and/or system directives 34, and/or to transmit distributors 36. The physical form of distributor 22 may include hardware and/or software/firmware and may include various components, such as coding/decoding mechanisms, media and/or control connector(s), and/or any other system capable of connecting to and/or transmitting data over one or more networks.

For example, distributor 22 may include a synthetic bridge that may remove all network protocol information from second network nodes 110 before transferring data over to first network nodes 108, event focus 24, and/or event manager 26. Examples of synthetic bridges are described in PCT Patent Application No. PCT/US2007/074851 entitled "Synthetic Bridging," and filed Jul. 31, 2007. The complete disclosure of that application is herein incorporated by reference for all purposes.

Additionally, or alternatively, distributor 22 may include one or more media stream capture mechanisms and one or more signal processors, which may be in the form of hardware and/or software/firmware. Alternatively, or additionally, distributor 22 may include at least some components of telephone(s), personal digital assistant(s), laptop(s), computer system(s), video conferencing studio(s), and/or other system(s) capable of connecting to and transmitting data over at least one network.

Distributor 22 may be referenced during an event through a unique identifier. That identifier may be intrinsic to the system, connection dependent such as IP address or telephone number, assigned by the event manager based on event properties, and/or decided by another policy asserted by the system.

As shown, distributor 22 may include a first network distributor 38 and a second network distributor 40. First network distributor 38 may include any suitable structure configured to receive second media streams 30 from at least one node communicatively coupled to second network 106, and/or to transmit the received second media streams to at least one node communicatively coupled to first network 104. Second network distributor 40 may include any suitable structure configured to receive first media streams 28 from at least one node communicatively coupled to first network 104, and/or to transmit the received first media streams to at least one node communicatively coupled to second network 106.

In some embodiments, first network distributor 38 may include a second composer 44, which may include any suitable structure configured to form second composite media streams from the received second media streams. In some embodiments, second network distributor 40 may include a first composer 42, which may include any suitable structure configured to form first composite media streams from the received first media streams. The first and second composers may include any suitable structure configured to combine and/or arrange outputs from multiple media streams into a single output. For example, the first and/or second composers may combine and/or arrange video images from multiple media streams into a single image. Examples of presentation of the first and second composite media streams are provided in FIGS. 8B-8C and 8E-8F, which are discussed below.

As shown in FIG. 3, distributor 22 also may include a manager 50, which may include any suitable structure adapted to receive and/or process input(s) 32 and/or other system directive(s) 34, and to configure the first network distributor and/or the second network distributor based, at least in part, on the received directives. Inputs may include signals from one or more nodes 100 and/or one or more user inputs. The intent of distributor 22 may include actual and/or desirable relationships present among first media streams 28, second media streams 30, first network nodes 108, and/or second network nodes 110, which may be in addition to the specific combination of features already activated to receive and/or transmit the media streams.

As shown in FIG. 3, manager 50 may include a pre-configured policy of preferences 52 within the manager that may create a list of prioritized intents 54 from the possible modes of participation for the distributor during a particular event. The prioritized intents may change from event to event and/or during an event. For example, the prioritized intents may change when a node, such as a second network node, attempts to join an event, leave an event, and/or participate in a different manner through the distributor. Manager 50 may receive signals from at least one second network node, and/or may transmit distributor requests to the event focus and/or the event manager based, at least in part, on the received signals.

As distributor 22 modifies its prioritized intents 54, distributor requests 36 may be sent and/or transmitted to event focus 24 and/or event manager 26. In one example, the distributor request may comprise one or more acts of connection, such as connecting to an event that may include one or more first network nodes 108 participating. In another example, the distributor request may include the list of prioritized intents and information about the capabilities and/or preferred modes of participation of the distributor.

In some embodiments, distributor 22 may include any suitable number of media devices 56, as shown in FIG. 4 and generally indicated at 22'. Media devices 56 may include any suitable structure configured to receive media streams from the first network distributor and/or the second network distributor, display and/or present the received media streams (such as local media output 58), generate or form media streams (such as from local media inputs 59), and/or transmit the generated media streams to first network distributor and/or the second network distributor for further distribution, such as to at least one first network node and/or at least one second network node. Media devices 56 may include telephone(s), microphone(s), camera(s), video screen(s), keyboard(s), scanner(s), and/or other input and/or output device(s).

Media devices 56 may comprise any hardware and/or software element(s) capable of interfacing with the first network distributor, the second network distributor, one or more other nodes 100, and/or one or more networks 102. One or more of the media devices may be configured to receive media streams from the first network distributor and/or the second network distributor, and/or reproduce and/or present the received media streams in a manner discernable to an attendee. Distributor 22' may additionally, or alternatively, include one or more environment devices 60, which may include any suitable structure configured to adjust the environment of the distributor and/or support one or more functions of one or more other nodes 100.

According to some embodiments, media devices 56 may be communicatively coupled to various possible media streams. Any number of media streams from the first network distributor and/or the second network distributor may be connected to the media devices, according to the event topology and capabilities of the distributor. The coupled media streams may be heterogeneous and/or may include media of different types.

In some embodiments, such as where the distributor includes one or more media devices 56 and/or one or more environment devices, manager 50 of the distributor may additionally, or alternatively, be adapted to configure the first network distributor, the second network distributor, the media device(s) and/or the environment device(s) based, at least in part, on the received directives. Additionally, or alternatively, the manager may generate notifications 51 to provide information to users and/or attendees of the configuration of media devices, node(s) participating and/or requesting participation in the event, etc.

Although a single distributor is shown, event manager system 20 may include two or more distributors, which may distribute media streams among nodes communicatively coupled to two or more networks. For example, a first distributor may be configured to distribute media streams among one or more nodes communicatively coupled to a first network and one or more nodes communicatively coupled to a second network, while a second distributor may be configured to distribute media streams among one or more nodes communicatively coupled to the first network and one or more nodes communicatively coupled to a third network.

FIG. 5 shows the elements and functions of event focus 24, according to some embodiments. The event focus may be configured to perform intermediate processing before relaying requests, such as node requests 120 and/or distributor requests 36, to event manager 26. Specifically, the event focus may include a software module capable of remote communication with the manager of one or more of nodes 100 and/or distributor 22.

Event focus 24 may include a common communication interface 64 and a network protocol translation 66, according to some embodiments. The common communication interface and/or the network protocol translation may allow the event focus to receive node requests 120 and/or distributor requests 36 from one or more nodes 100, and/or distributor 22, translate those requests, forward the requests to event manager 26 and receive selected intents 68 and/or media connection assignments 70 from the event manager. In some embodiments, the event focus may receive requests from the first network nodes and/or the distributor.

The selected intents and media connection assignments may then be translated to directives 72 by the event focus for transmission to selected nodes and/or the distributor. The use of event focus 24 to forward and process requests to the event manager may eliminate a need for individual nodes 100 to guarantee compatibility with potentially unforeseen network topologies and/or protocols.

According to the present illustrative systems and methods, the nodes may participate in an event through various types of networks, which may each have differing capabilities and/or protocols. The event focus may provide at least some of the nodes with a common point of contact with the event. According to some embodiments, node requests 120 and/or distributor requests 36 transmitted to event focus 24 may be interpreted and converted to a format and/or protocol meaningful to event manager 26.

After the event manager determines the new event topology and media stream connections, the event manager may transmit the data to the event focus for distribution to the nodes and/or the distributor. Event focus 24 may then communicate individualized directives 72 to one or more of the nodes 100, and/or the distributor that are affected by the directives, indicating a change in the participation of the various nodes and/or the distributor. In some embodiments, the event focus may send directives 72 to first network nodes 108 and/or distributor 22.

According to some embodiments, directive 72 may include the selected intent and/or new media connection assignments among the node and/or distributor receiving the directive and any number of participating nodes and/or the distributor. The event focus may be configured to communicate the various directives to nodes 100 through the preferred or actual network protocol for each participating node and/or the distributor.

Node 100, such as first network node 108 and/or second network node 110, may include a telephone that may submit a request 120 to join an event in the form of dialing a number. That request may implicitly indicate that the attendee's system supports the exchange of audio data and that the attendee desires to participate in the event in audio mode. Other requests may be more explicit. Node 100 also may send a request 120, which may be interpreted and/or translated to an appropriate form by event focus 24 before the request may be communicated to event manager 26. In some embodiments, requests 120 from second network nodes 110 may be received by the manager of the distributor. That manager may then send out requests to the event focus based, at least in part, on the requests from the second network nodes.

When the event manager generates media stream assignments, the event focus may form directives 72 useful to one or more of nodes 100 and/or the distributor, which, in the case of the telephone node, may comprise an established connection to a stream of composite audio data for the conference.

The event focus may not determine which connections to assign but may provide the event manager one or more channels through which to communicate node configuration and/or distributor configuration data, even if the data may be destined for networks of differing protocols and/or capabilities.

A single event focus 24 may communicate using multiple networks and/or protocols, and thus acts as a gateway among nodes 100, distributor 22, and/or event manager 26. In addition, multiple nodes 100 using the same protocol may communicate with event manager 26 through a single event focus 24. The event focus also may allow the event manager to communicate with nodes 100 from many manufacturers, which may connect through Session Initiation Protocol (SIP) or other standards.

Communication between a node 100 and event manager 26 may be routed through at least one event focus 24 even if the node and the event manager use the same network and/or protocol. In some embodiments, event management system 20 may include multiple event focuses where each event focus may be associated with one or more network protocols and/or connection management protocols used by particular types of nodes. Alternatively, or additionally, one or more of the multiple event focuses may be capable of multiple network protocols and/or connection management protocols used by particular types of nodes.

According to another illustrative example, one node 100 coupled to the illustrative event manager system may participate in an event through a local area network, another node may participate through the internet, and a third node may participate through an encrypted virtual private network (VPN). As each node 100 joined the event, left the event, or requested to change intent, the corresponding node request may be translated by the associated event focus into the form preferred by the event manager. The module for network protocol translation 66 may employ encryption, decryption, authentication, and/or other capabilities to facilitate communication among the nodes and the event manager. In some embodiments, distributor 22 may incorporate at least some of the components and/or functions of the event focus. Although a single event focus 24 is shown, the event manager system may include two or more event focuses, each of which may be connected to different sets of nodes communicatively coupled to one or more networks.

Figure 6:
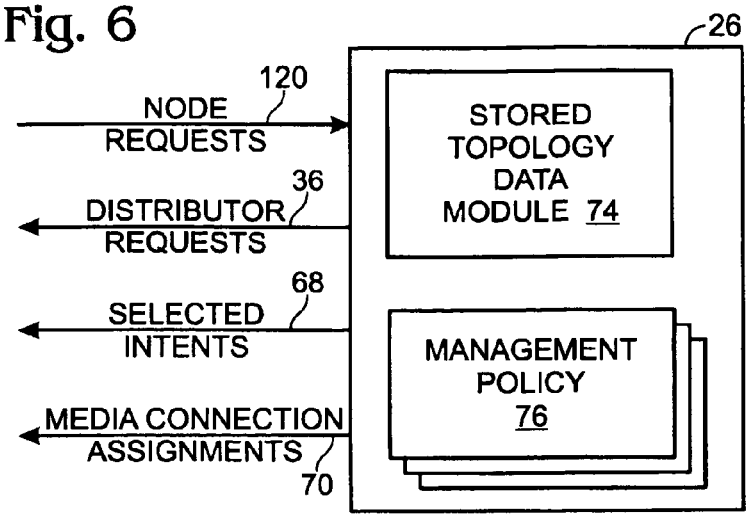
FIG. 6 is a block diagram of an event manager, according to some embodiments.

FIG. 6 shows the components, inputs, and outputs of event manager 26, according to some embodiments. The event manager may communicate with the event focus directly. However, according to one alternative illustrative example, the event manager may be communicatively coupled to the event focus via a communication network. Alternatively, such as in embodiments where distributor 22 includes at least some components and/or functions of the event focus, the event manager may communicate directly with the distributor and/or the nodes.

Regardless of the communication means between the event focus and the event manager, the event manager may include a data storage module or stored topology data module 74 and a plurality of management policies 76. According to some embodiments, the stored topology data module associated with the event manager may describe the state and/or topology of an event, as perceived by the event manager. That data may, according to some embodiments, include the identity of nodes 100 and/or distributor 22 participating in an event, the virtual relationships among the nodes and/or the distributor, the intent or manner in which one or more of the nodes and/or the distributor are participating, and the capabilities of one or more of the nodes and/or the distributor.

Event manager 26 also may maintain a record of prioritized intents for one or more of nodes 100 and/or distributor 22. As mentioned previously, an intent may include information about relationships among multiple nodes 100, media devices 122, and/or the distributor, whether present or desired. Additionally, an intent may specify a narrow subset of capabilities of node 100 and/or distributor 22 that are to be utilized during a given event in a certain manner. For example, a first node may include three displays capable of displaying multiple resolutions. An intent for the first node may include a specified resolution for media received from a certain second node, as well as the relationship that the media streams from the second node should be displayed on the left-most display. Additionally, event manager 26 may optimize an event topology based on the intents and/or combinations of intents received.

According to some embodiments, event manager 26 may be configured to receive node requests 120 and/or distributor requests 36 from at least one event focus. The node requests and/or the distributor requests may be identical to the requests originally generated by the nodes and/or the distributor, or may be modified by the event focus to conform to a certain specification, interface, or protocol associated with the event manager.

According to some embodiments, the event manager may make use of stored topology data 74 to create new media connection assignments 70 when node 100 or distributor 22 requests to join an event, leave an event, or change its intent. Prioritized intent information may allow the event manager to assign media streams most closely matching at least some of the attendee's preferences. Additionally, virtual relationship data may allow the event manager to minimize disruption to the event as the topology changes, and node and/or distributor capability data may prevent the event manager from assigning media streams not supported by an identified node or the distributor.

When a change in topology is requested or required, the event manager may select the highest priority intent acceptable to the system for one or more of the nodes 100 from the prioritized intents. The selected intent may represent the mode of participation implemented for the node at that time for the specified event. Changes in the event or in other systems participating in the event may cause the event manager to select a different intent as conditions change. Selected intents may be conditioned on any number of factors including network bandwidth or traffic, the number of other nodes participating in an event, the prioritized intents of other participating nodes and/or other nodes scheduled to participate, a policy defined for the current event, a pre-configured management policy, and/or other system parameters.

According to some embodiments, management policies 76 associated with the event manager may be pre-configured policies, which, according to one example, may specify which nodes, and/or attendees are permitted to join an event. The management policies may additionally, or alternatively, apply conditions and/or limitations for an event including a maximum duration, a maximum number of connected nodes, a maximum available bandwidth, a minimum-security authentication, and/or minimum encryption strength. Additionally, or alternatively, management policies may determine optimal event topology based, at least in part, on node intents.

The event manager may be configured to transmit a description of the updated event topology to event focus 24. That description may include selected intents 68 for one or more of nodes 100 and/or the distributor as well as updated media connection assignments 70 for those nodes and/or the distributor. The formation of media connection assignments by the event manager may provide for the optimal formation and maintenance of virtual relationships among the nodes and/or the distributor.

Topology and intent information also may be used to modify the environment of one or more of nodes 100 and/or distributor 22, including the media devices not directly related to the transmission, receipt, input, and/or output of media. Central management by the event manager may apply consistent management policies for requests and topology changes in an event. Additionally, the event manager may further eliminate potentially conflicting configurations of media devices and media streams. Details of the illustrative operation of the event manager system will be described below, with reference to FIGS. 7 through 12 below.

Figure 7:
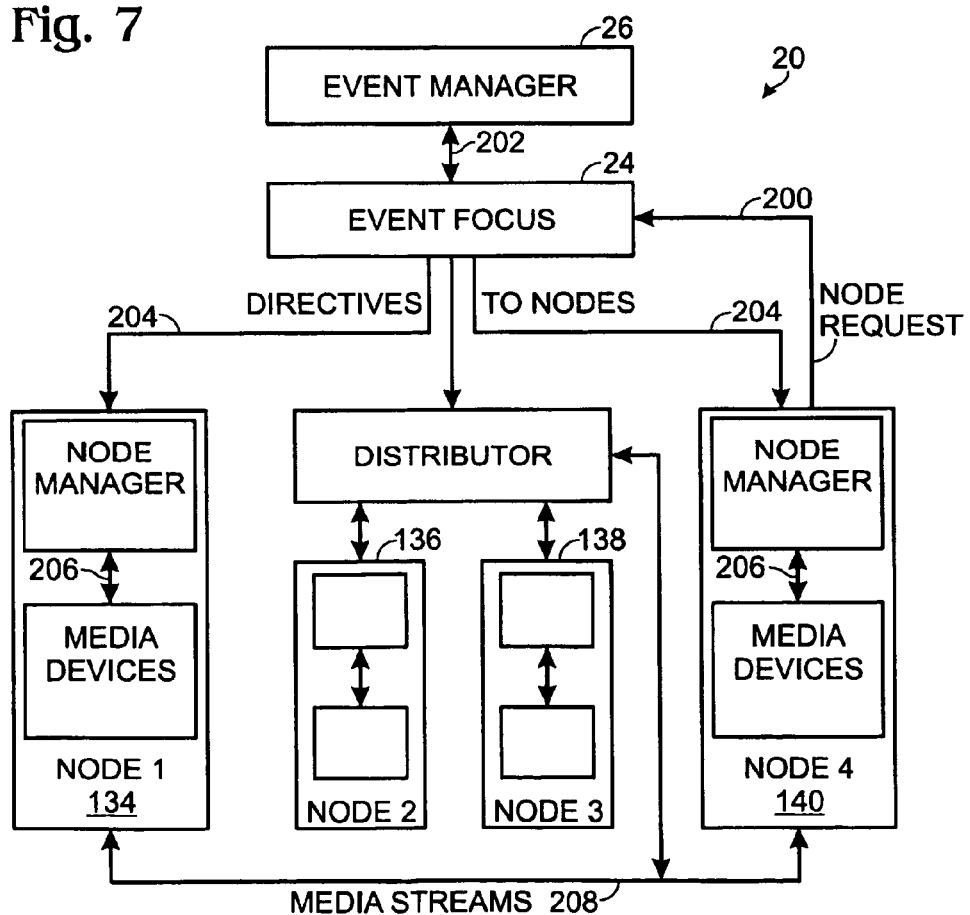
FIG. 7 is a block diagram of a sequence of connections established as a node joins a collaborative event, according to some embodiments.

FIG. 7 shows a sequence of connections utilized as a fourth node 140 joins an event in progress, according to some embodiments. The event in progress may include a first node 134 communicatively coupled to the first network, and second and third nodes 136, 138 communicatively coupled to the second network. According to the illustrative example illustrated in FIG. 7, fourth node 140 may send an initial request to the event focus requesting to join the event, illustrated by arrow 200. Request 200 may contain information that includes the node type, and/or capabilities of the fourth node, as well as prioritized intents or preferred modes of participation of the fourth node.

When the initial request is received by the event focus, the event focus may then forward the request to the event manager, and, in turn, may receive those aspects of the updated event topology from the event manager which are necessary to be transmitted to nodes 134 and 136 and the distributor associated with the event focus, including new media connection assignments and/or selected intents. The two-way communication between the event manager and the event focus is illustrated by the communication arrow 202.

After receiving the updated event topology from the event manager, including new media connection assignments and/or selected intents, the event focus may translate the new media connection assignments and/or selected intents into directives. Once translated, the directives may be transmitted to node(s) that are experiencing a change in configuration (also may be referred to as "affected nodes") and/or to the distributor, if it is experiencing a change in configuration, as illustrated by transmission arrows 204.

As the affected node(s) and/or the distributor receive the transmitted directives, manager(s) may interpret and may apply the directives received and may send appropriate configuration data and commands to its media device(s) and/or other component(s) to support the new topology. The mentioned communication among the node manager and the media device(s) are illustrated as communication arrows 206.

When appropriately configured to reflect the understood topology, media streams may be connected among the various nodes and/or the distributor as previously assigned by the event manager. The transmission of the various media streams is illustrated by communication arrow 208. The illustrative configuration illustrated in FIG. 7 may provide for dynamic adjustments of system topology while managing intents, capabilities, and/or configurations of the node(s) and/or the distributor.

Figure 8A:
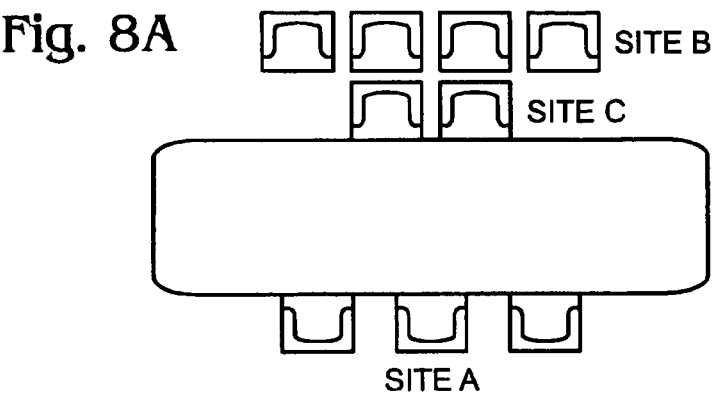
FIGS. 8A through 8F are schematics of virtual relationships for collaborative events involving three or seven nodes, according to various illustrative examples.
Figure 8B:
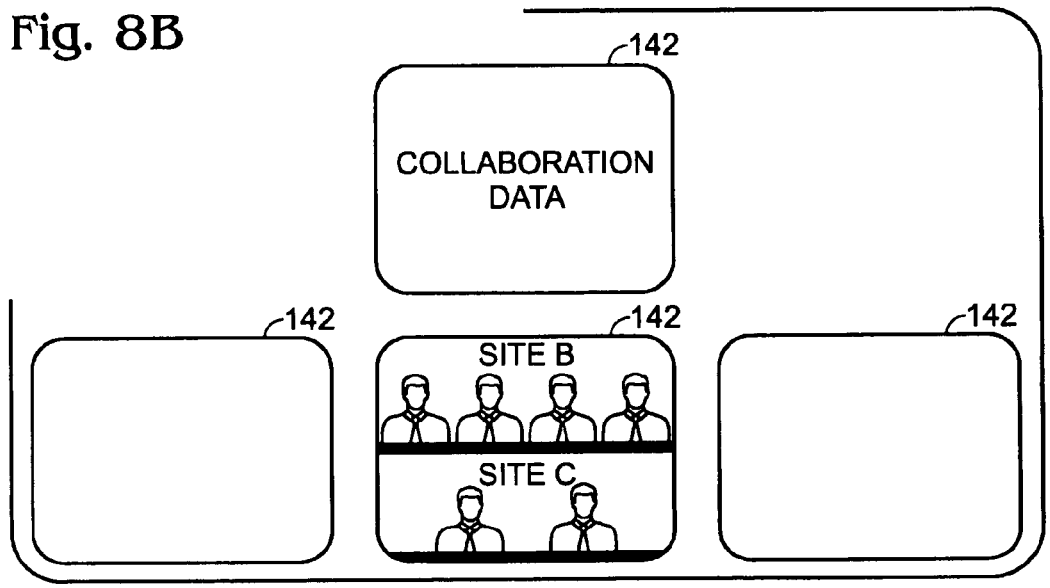
Figure 8C:
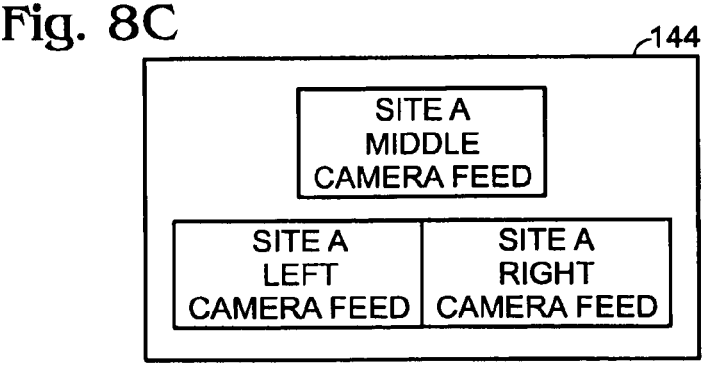
Figure 8D:
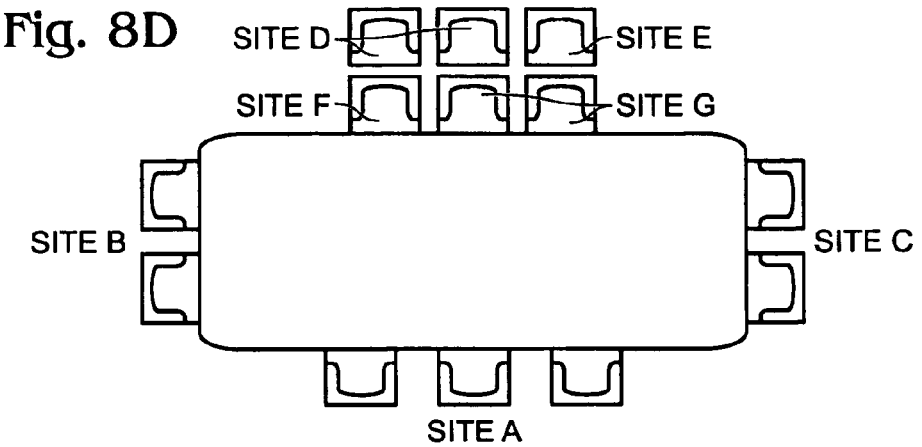
Figure 8E:
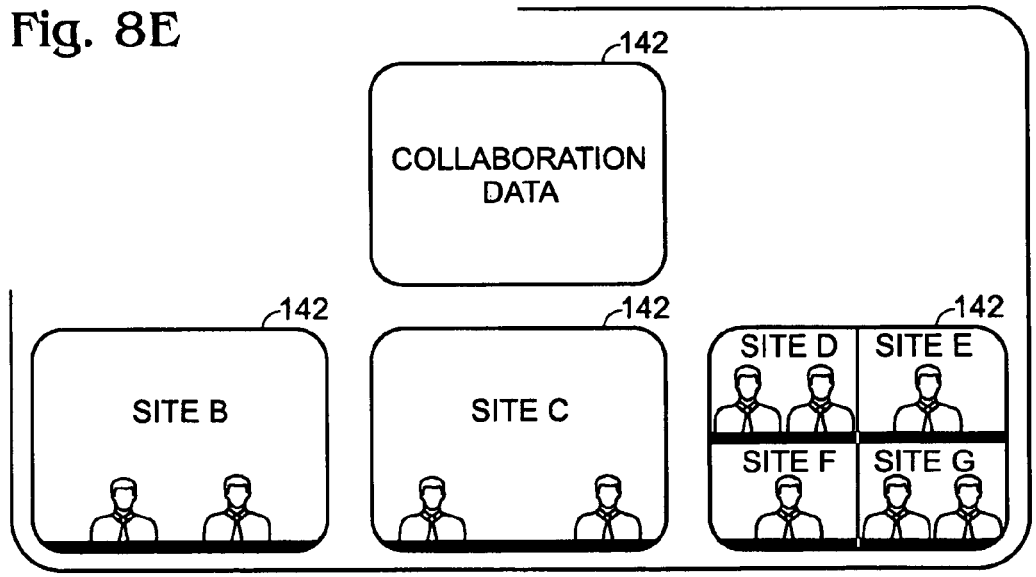
Figure 8F:
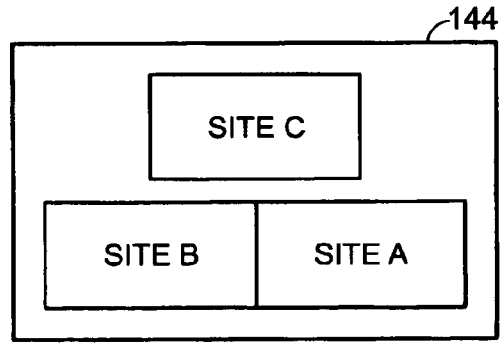

FIGS. 8A through 8C illustrate typical virtual relationships present in topologies containing a node communicatively coupled to the first network and two nodes communicatively coupled to the second network. Similarly, FIGS. 8D through 8F illustrate optimal virtual relationships present in topologies containing three nodes communicatively coupled to the first network, and four nodes communicatively coupled to the second network, according to various examples. While FIGS. 8A through 8F illustrate topologies containing either three or seven nodes, the present illustrative system is in no way limited to the topologies depicted. Rather, varying numbers of nodes allow for many complex topologies. For a given event, the optimal virtual relationships may vary, even for topologies containing the same number of nodes. For example, node capabilities may vary and may contain any suitable combination of additional displays, cameras (with any suitable camera angle(s)), and/or other media devices to allow additional relationships.

As illustrated in FIGS. 8D through 8F, each virtual site (sites A-G) depicted represents a node with at least one attendee present. Additionally, site A illustrated in FIGS. 8A-8C, and sites A-C illustrated in FIGS. 8D-8G, have three cameras and four displays 142, while site B illustrated in FIGS. 8A-8C, and sites D-G illustrated in FIGS. 8D-8G have a single camera and a single display. However, nodes participating in the present systems and methods may have any suitable number of cameras and/or displays.

According to some embodiments, the virtual relationships established among the various nodes by the event manager system may simulate spatial relationships among attendees and promote meaningful interaction. Particularly, according to some embodiments, the perceived topology and issued directives may correspond to certain virtual relationships being envisioned as seats around an imaginary table, where video and/or audio are perceived to come from the left, right, or directly in front of the attendee. According to some embodiments, the virtual relationships may be maintained throughout an event, giving an event a sense of realism and eliminating distractions.

According to some embodiments, the consideration of relationships among the nodes and their corresponding video streams may allow an attendee to speak with remote attendees as if they were looking through a virtual window. One type of virtual relationship may include, for example, the association of a video input stream from an identified node with a corresponding display, camera, and video output stream to allow natural eye contact among attendees at the two nodes. If video from a first node is displayed on the left-most display of a second node, the left-most camera of the second node may be configured to capture the video stream sent back to the first node. Consequently, when an attendee turns to view the left display, his expressions and comments may be transmitted as if he were speaking directly to the attendee displayed on his screen. The connection of video streams to appropriate displays may maintain natural eye contact and may facilitate natural communication among attendees. Additionally, this illustrative configuration may allow the participants to know when other participants are distracted or are shifting their attention from one participant to another.

In conjunction with the video arrangement described above, audio streams also may be linked among attendees based on a virtual relationship among the nodes. Specifically, according to some embodiments, audio recorded from a specific node may be reproduced at the recipient node with the same orientation as the display showing the attendee transmitting the audio stream. Each attendee's voice received may then correspond spatially with the video image of that attendee, enhancing the perceived relationship among the attendees.

According to some embodiments, the event manager may store the topology data containing a record of virtual relationships present in an event and generates the above-mentioned perceived relationships. As the event manager receives node requests and/or distributor requests, at least some changes in topology may take into consideration the best configuration to maintain those virtual relationships and form new ones as necessary. These considerations allow smooth transitions among topologies with varied numbers of participating nodes.

Additionally, as shown in FIGS. 8B and 8E, media streams from second network nodes 110 may be composited by the distributor before being transmitted to first network nodes 108. Additionally, or alternatively, media streams from first network nodes 108 may be composited by the distributor before being transmitted to second network nodes 110, as shown in FIGS. 8C and 8F. Examples of first network media streams composited by the distributor are shown at 144 in those figures.

While FIGS. 8A through 8F illustrate virtual relationships in illustrative three and seven node configurations, FIGS. 9A through 9D illustrate optimal media connections present in topologies containing three and seven nodes where the distributor and each node communicatively coupled to the first network may select among three available camera views, according to some embodiments. As mentioned previously, the three and seven node topologies are merely examples. Any number of nodes may be managed according to the teachings of the present illustrative systems and methods.

Figure 9A:
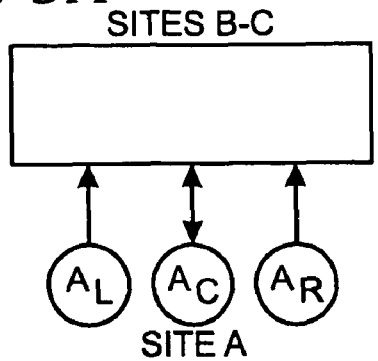
FIGS. 9A through 9D illustrate media streams transmitted and received during collaborative events involving three or seven nodes, according to various illustrative examples.
Figure 9C:
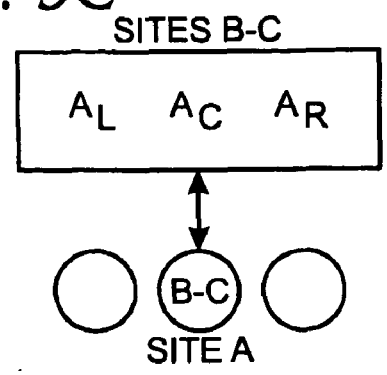
Figure 9B:
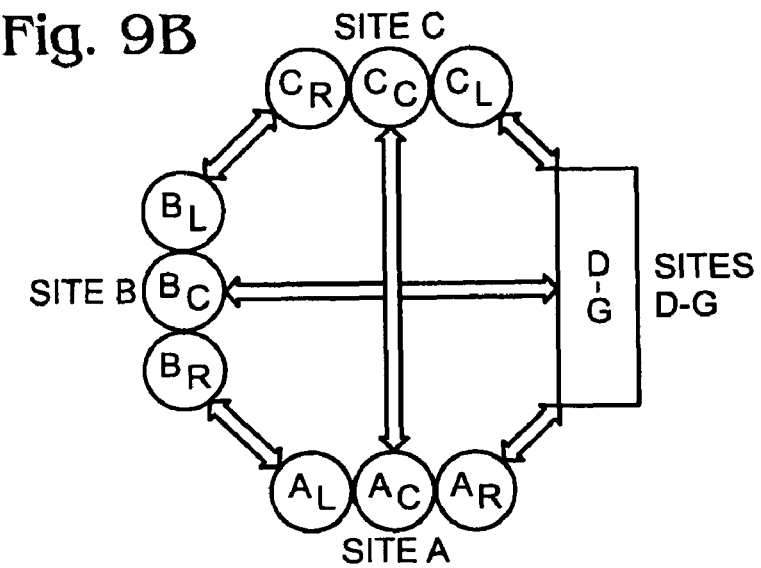
Figure 9D:
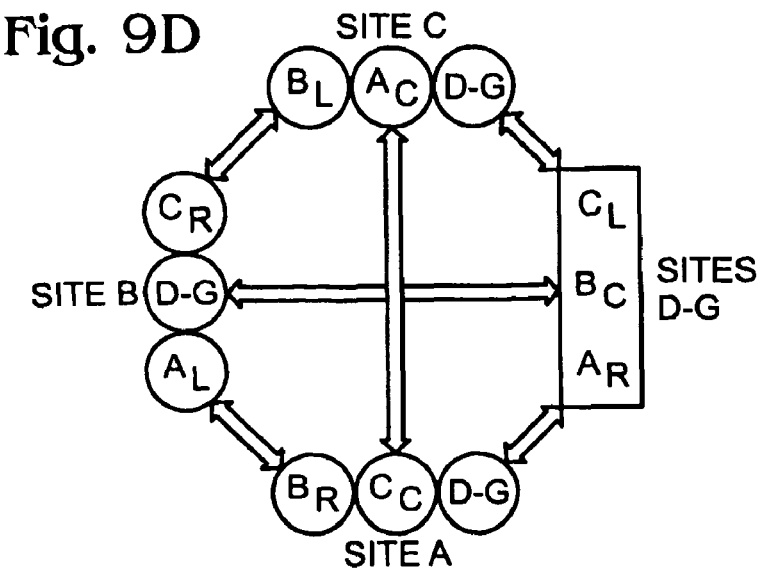

According to some embodiments illustrated in FIGS. 9A through 9D, nodes may be allowed to form virtual relationships based on the direction and assignment of streams received and transmitted. As shown, site labeled "A" in FIGS. 9A and 9C, and sites labeled "A" through "C" in FIGS. 9B and 9D represent a node with at least three cameras or available camera angles and at least three displays. The media connections indicated may originate from the site specified and the left, center, or right camera view is indicated by a subscript of "L", "C", or "R." The designation "$A_C$," for example, indicates a media stream originating from the center camera of site or node A.

For example, in the seven-node topology illustrated in FIG. 9B, the leftmost camera of site A may transmit its stream "$A_L$" to the rightmost display of site B. Additionally, the leftmost display of site A ($A_L$) may receive the rightmost camera view of site B denoted as "$B_R$." Moreover, as illustrated in FIG. 9D, the orientation of the streams transmitted corresponds to the orientation of the streams received in FIG. 9B, further adding to consistency and a sense of realism. Streams from the second network nodes (Sites D-G) may be received as a composite stream in the appropriate displays in Sites A-C.

While the examples depicted in FIGS. 9A through 9D involve nodes with at least three cameras and at least three displays and nodes with a single camera and a single display, nodes with any suitable combination of media devices may participate in an event and/or the event topology depicted in those figures. For example, a node having only a telephone may participate in the topologies depicted through audio only. Attendee preferences, bandwidth limitations, policies and restrictions for a given event, node capabilities, and/or other factors may be considered by the event manager in making the appropriate media connection assignments 70.

Figure 10:
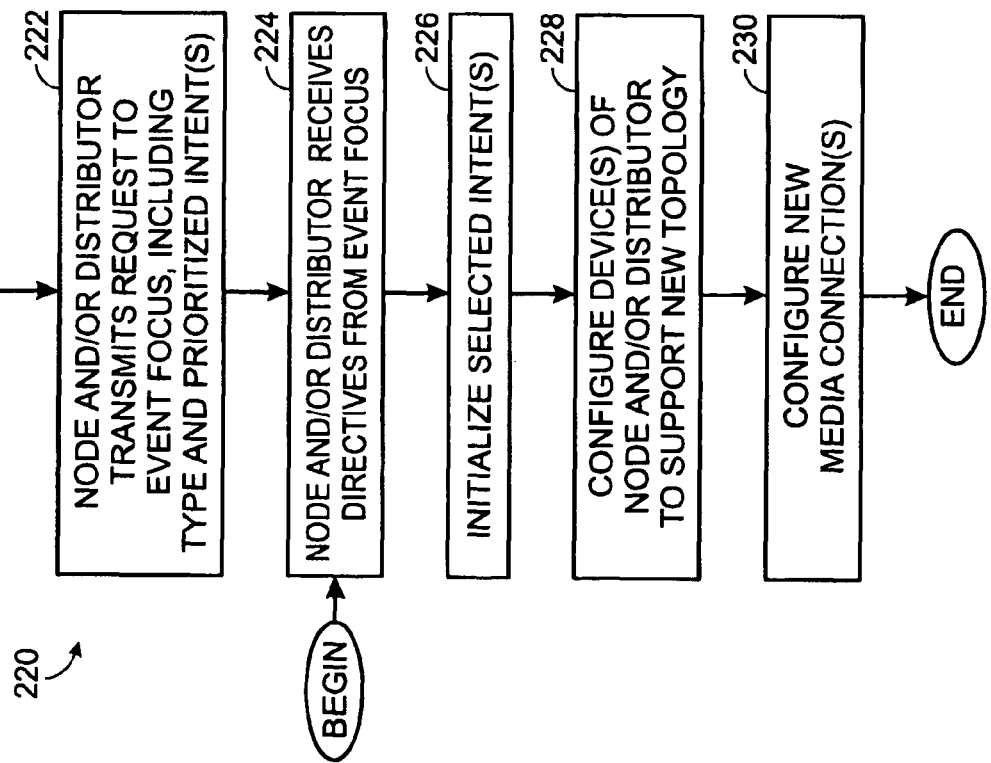
FIG. 10 is a flow chart of a method of operation of a manager of a node and/or a distributor, according to some embodiments.

Continuing with the methodologies of the event manager system, FIG. 10 shows an illustrative method of operation of the manager of node 100 or distributor 22, according to some embodiments. While FIG. 10 shows illustrative steps of operation according to one example, other examples may omit, add to, and/or modify any of the steps shown in FIG. 10, as will be understood by one of ordinary skill in the art.

As illustrated in FIG. 10, the illustrative virtual collaboration method may be initiated when a node attempts to join or leave an event, or when a participating node changes its desired mode of participation. According to the present illustrative systems and methods, when a node attempts to join or leave an event, or when a participating node changes its desired mode of participation, the node may transmit a request to the event focus at 222. That request may include the prioritized list of intents as well as the node type of the requesting node. The information provided to the event focus may be explicit, but may additionally, or alternatively, be implicitly signaled by the type of request transmitted.

Once the node request has been processed, the node that initiated the request may receive directives from the event focus instructing which media connections have been assigned and which intent has been selected at 224. Directives also may be transmitted to one or more of the other nodes and/or the distributor that exchange media information with the requesting node in order to establish connections in the new topology. Consequently, as illustrated in FIG. 10, one or more of the nodes and/or the distributor also may begin the process with the transmission of directives from the event focus at 224, even without having initiated a request.

After receiving a directive, the node manager associated with one or more of the nodes may initialize the selected intent corresponding to the received directive at 226. Specifically, according to some embodiments, the node manager may be configured to calculate a preferred configuration of one or more of its associated media devices to comply with the directive received. Additionally, the node manager associated with the receiving node also may change settings and/or execute initialization software to initialize node functionality. According to some embodiments, any number of factors may be considered in selecting the preferred configuration for one or more of the media devices in response to a received directive. Particularly, allocation of the media devices and previously received directives may influence the preferred configuration calculated by the node manager.

Once the node has been initialized to the selected intent, the node manager may configure the media device(s) to allow them to support the assigned media connections and topology at 228, and may configure the node's environment devices to optimize participation. For example, the node manager may dim nearby lights to improve the visibility of a display and/or may dim lights over seats that may not be visible in the event. With the media devices and/or the environment devices configured, the node may then be ready to support as many connections as have been assigned, and may support the transmission and receipt of media in the forms specified by the selected intent.

Finally, the media streams connecting one or more of the nodes and/or the distributor may be established for the new topology at 230. With the media streams established, the exchange of data may begin, and may continue until additional directives change the mode of participation of one or more of the nodes and/or the distributor. In some embodiments of the method of operation, requests from the second network nodes may be received by the distributor, and the distributor may then send distributor requests based, at least in part, on the received requests. In some embodiments, the event focus and the event manager may send directives to the first network nodes and the distributor, and the distributor may then configure its components as described below.

Similarly, the illustrative virtual collaboration method may be initiated when the distributor attempts to join or leave an event, or when the distributor is participating in the event and wants to changes its desired mode of participation. For example, the distributor may attempt to join an event because it has started receiving signals and/or media streams from a second network node, or may alter its desired mode of participation because it has received signals and/or media streams from one or more additional second network nodes. When the distributor attempts to join or leave an event, or when it changes its desired mode of participation, the distributor may transmit a request to the event focus at 222. That request may include the prioritized list of intents as well as identification information of the distributor. The information provided to the event focus may be explicit, but may additionally, or alternatively, be implicitly signaled by the type of request transmitted.

Once the request has been processed, the distributor may receive directives from the event focus instructing which media connections have been assigned and which intent has been selected at 224. Directives also may be transmitted to one or more of the nodes that exchange media information with the distributor in order to establish connections in the new topology. Consequently, as illustrated in FIG. 10, one or more of the nodes and/or the distributor also may begin the process with the transmission of directives from the event focus at 224, even without having initiated a request.

After receiving a directive, the manager associated with the distributor may initialize the selected intent corresponding to the received directive at 226. Specifically, according to some embodiments, the manager may be configured to calculate a preferred configuration of the first network distributor, the second network distributor, and, in some embodiments, the distributor media devices, to comply with the directive received. Additionally, the manager also may change settings and/or execute initialization software to initialize distributor functionality. According to some embodiments, any number of factors may be considered in selecting the preferred configuration for the first network distributor, the second network distributor, and/or one or more of the media devices in response to a received directive. Particularly, allocation of the first network distributor, the second network distributor, and/or the media devices, and previously received directives may influence the preferred configuration calculated by the manager.

Once the distributor has been initialized to the selected intent, the manager may configure the first network distributor, the second network distributor, and/or the media device(s) to allow them to support the assigned media connections and topology at 228, and may configure the distributor's environment devices, if any, to optimize participation. With the first network distributor, the second network distributor, the media devices, and/or the environment devices configured, the distributor may then be ready to support as many connections as have been assigned, and may support the transmission and receipt of media in the forms specified by the selected intent.

Finally, the media streams connecting one or more of the nodes and/or the distributor may be established for the new topology at 230. With the media streams established, the exchange of data may begin, and may continue until additional directives change the mode of participation of the distributor and/or one or more of the nodes.

Figure 11:
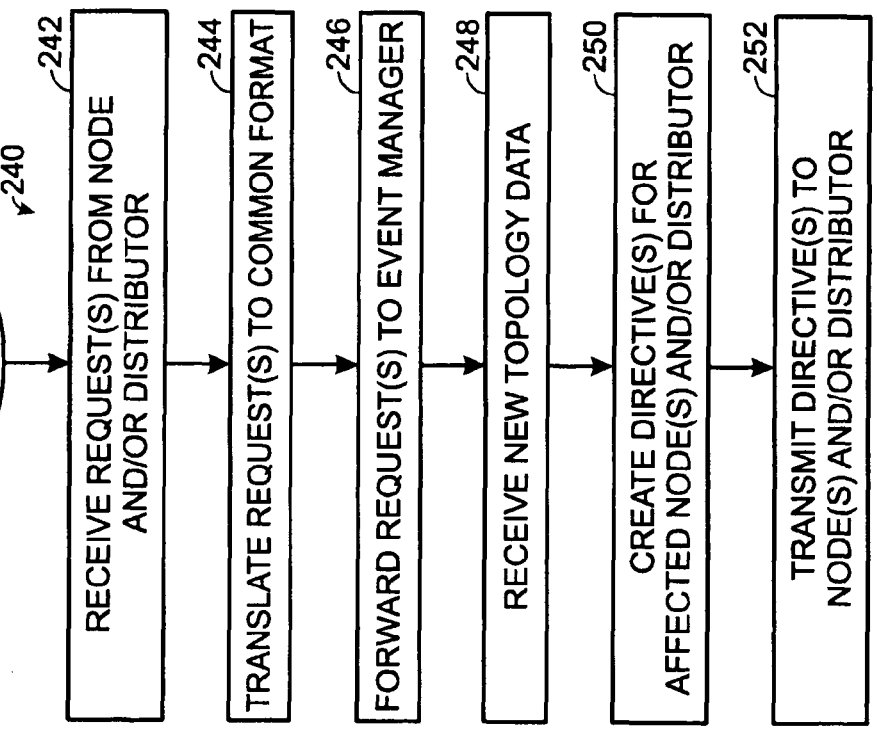
FIG. 11 is a flow chart of a method of operation of an event focus, according to some embodiments.

FIG. 11 shows an illustrative method of operation 240 of the event focus during an event, according to one example.

While FIG. 11 shows illustrative steps according to one example, other examples may omit, add to, and/or modify any of the steps shown in FIG. 11. As illustrated, the operation of the event focus may begin when the event focus first receives a node request and/or a distributor request at 242. As mentioned previously, the node request may be received from any suitable number of nodes.

Once the node request is received, the event focus may translate the request received into a common format preferred by the event manager at 244. The translation to a standard format may include providing a common interface to communicate among multiple network systems and protocols. According to some embodiments, any number of event manager preferred protocols may be used. Once the request is in the correct form, the event focus may forward the request to the event manager at 246.

After the event manager has received and/or processed the node request, updated topology data may be transmitted from the event manager to the event focus. The event focus may receive the updated topology data from the event manager at 248, and may create directives for the affected nodes and/or the distributor based, at least in part, on the updated topology data at 250. The topology data received from the event manager may designate the intents selected for one or more of the nodes as well as the source, destination, and/or type of one or more of the media streams connecting one or more of the nodes and/or the distributor.

The topology data may be specific enough, for example, to maintain virtual relationships among the node(s) and the distributor, such as the left camera view from one node being displayed on the right-most display of a second node or on the right-most display of the distributor in embodiments where the distributor includes three display devices. The event focus may not necessarily track the virtual relationships among the various nodes and/or the distributor because those relationships may be considered by the event manager. Consequently, according to some embodiments, the event focus may receive a detailed specification of the event for the nodes and/or the distributor.

With the updated topology data received, the event focus may create directives instructing one or more of the nodes and/or the distributor to establish the correct media connections and may initialize the selected intent at 250. The event focus may then send the recently created directives to one or more of the nodes and/or the distributor that may have been affected by the change in topology for implementation at 252. The event focus may then await reception of further node requests and/or distributor requests at 242.

FIG. 12 shows an illustrative method of operation 260 of the event manager upon reception of node requests and/or distributor requests, according to one example. While FIG. 12 shows illustrative steps according to one example, other examples may omit, add to, and/or modify any of the steps shown in FIG. 12. As shown in the illustrative method of FIG. 12, the operation may begin when the event manager is first assigned to at least one event at 262. As mentioned previously, a single event manager may be assigned to any number of events, depending on the capabilities of the specific event manager.

After being assigned to at least one event, the event manager may then wait for requests that will affect the topology of an event that the event manager is assigned to manage at 264. When the event manager receives requests from at least one event focus (or from another client and/or source, such as an administration tool) at 266, the information received may then be stored for later use. Requests may be received from sources such as scheduling applications and/or other support applications.

Specifically, according to some embodiments, the received information may be stored for use in responding to the received request. Based on at least one pre-configured management policy, the event manager may determine the best way to respond to the request at 268. One policy, for example, may use authentication to restrict participation to certain individuals. Another policy may request permission from an already participating node for a new node and/or the distributor to join an event. Another policy may allow as many nodes and the distributor to participate in an event as network bandwidth allows.

After the relevant management policies are applied, the event manager may formulate a new topology and may store the state of the event at 270. According to some embodiments, the event manager may take into account the current topology and additional stored information, such as the prioritized intents of the nodes currently participating in the event and/or the distributor. The event manager may then form the new topology to create and maintain effective virtual relationships among the participating nodes and the distributor. Furthermore, the event manager may take into account varying capabilities of the node(s) and/or the distributor and will not assign media connections that a node and/or the distributor cannot support.

Once the new topology is created, the event manager may transmit the topology data to at least one event focus associated with the event at 272. The topology data may include information specific to one or more of the nodes and/or the distributor, including one or more media connection assignments and selected intents for one or more nodes and the distributor that communicate with a given event focus. After the topology data has been updated and transmitted, the event manager may return to step 264 to wait for additional requests. One or more of the above illustrative methods, and/or other methods of operation according to this disclosure, may be in the form of computer-executable instructions stored on computer-readable media.

In conclusion, the present illustrative configuration systems and methods are adapted to manage the configuration of virtual collaboration systems during event adjustment. Specifically, the present illustrative method may, among other things, intrinsically consider the relationships among related media streams, manage the virtual relationships among nodes and/or the distributor to optimize the directives to the nodes and/or the distributor to support a new topology, and support a variety of proprietary and industry-standard communications mechanisms while managing one or more of the nodes and/or distributor equivalently in the event itself. Further, the present illustrative systems and methods, according to some embodiments, maintain the virtual relationships among node (s) and/or the distributor throughout an event, giving the event a sense of realism while eliminating distractions.

The preceding description has been presented only to show and describe examples of the present illustrative systems and methods. It is not intended to be exhaustive or to limit the systems and methods to any precise form disclosed. Many modifications and variations are possible in light of the above teachings.

What is claimed is:
1. A virtual collaboration system, comprising:
  a distributor communicatively coupled to a first network and a second network having different network characteristics from the first network, the distributor configured to receive first media streams from at least one first network node on the first network, and to transmit the first media streams to at least one second network node on the second network; and a management subsystem programmed to receive a request from a participant device in a virtual collaborative event to change a mode of participation of that participant device in the virtual collaborative event and to then dynamically configure a topology of the virtual collaborative event in accordance with said request, wherein configuration of the topology includes a determination of media stream connections among the distributor and the at least one first network node based, at least in part, on at least one policy, and wherein the media stream connections establish and maintain virtual relationships among the at least one first network node and the at least one second network node.

2. The system of claim 1, wherein the distributor is further configured to receive second media streams from the at least one second network node, and to transmit the second media streams to the at least one first network node.

3. The system of claim 1, wherein the management subsystem includes a data storage module configured to store topology data describing at least one topology of the virtual collaborative event.

4. The system of claim 3, wherein the topology data includes the capabilities of at least the distributor and the at least one first network node.

5. The system of claim 1, wherein the distributor comprises:

a manager configured to transmit requests to change a mode of participation of the distributor in an event;

a first network distributor configured to receive the second media streams from the at least one second network node, and to transmit the received second media streams to the at least one first network node; and a second network distributor configured to receive the first media streams from the at least one first network node, and to transmit the received first media streams to the at least one second network node.

6. The system of claim 5, wherein the requests includes at least one of capabilities and preferred modes of participation of the distributor.

7. The system of claim 5, wherein the manager is further configured to receive and respond to directives from the management subsystem by configuring at least one of the first and second network distributors.

8. The system of claim 5, wherein the first network distributor includes a second composer configured to form second composite media streams from the received second media streams.

9. The system of claim 8, wherein the second network distributor includes a first composer configured to form first composite media streams from the received first media streams.

10. The system of claim 5, wherein the distributor further comprises at least one media device configured to receive and present first media streams from the at least one first network node, and to generate and transmit distributor media streams to the at least one first network node.

11. The system of claim 10, wherein the first network distributor is further configured to receive the second media streams from the at least one second network node, and to transmit the received second media streams to the at least one media device and to the at least one first network node.

12. The system of claim 11, wherein the second network distributor is further configured to receive the distributor media streams from the at least one media device and the first media streams from the at least one first network node, and to transmit the received distributor media streams and the received first media streams to the at least one second network node.

13. A method of managing configuration of a topology of a virtual collaborative event involving at least one node communicatively coupled to a first network and at least one node communicatively coupled to a second network, the second network having different network characteristics from the first network, comprising:

receiving a signal from the at least one node communicatively coupled to a second network to alter participation in the virtual collaborative event;

formulating a new topology based on at least one policy, wherein the topology creates and maintains virtual relationships among the at least one node communicatively coupled to a first network and the at least one node communicatively coupled to a second network;

communicating media stream assignments to at least one node affected by the new topology; and configuring the affected at least one node to establish media streams according to the media stream assignments.

14. The method of claim 13, wherein receiving a signal from the at least one node includes receiving capabilities and preferred modes of participation from the at least one node communicatively coupled to the second network.

15. The method of claim 13, wherein communicating media stream assignments includes forming and transmitting individualized directives for the at least one node affected by the new topology.

16. The method of claim 13, wherein configuring the affected at least one node includes receiving first media streams from the at least node communicatively coupled to the first network, and transmitting the received first media streams to the at least one second network node.

17. The method of claim 16, wherein configuring the affected at least one node further includes forming first composite media streams from the received first media streams, and transmitting the first composite media streams to the at least one second network node.

18. The method of claim 16, wherein configuring the affected at least one node includes receiving second media streams from the at least one second network node, and transmitting the received second media streams to the at least one first network node.

19. The method of claim 18, wherein configuring the affected at least one nodes includes forming second composite media streams from the received second media streams, and transmitting the second composite media streams to the at least one first network node.

20. A non-transitory computer-readable media comprising computer-executable instructions for managing configuration of a topology of a virtual collaborative event involving at least one node communicatively coupled to a first network and at least one node communicatively coupled to a second network, the second network having different network characteristics from the first network, the computer-executable instructions causing a computer, when implementing said instructions, to:

receive a signal from the at least one node communicatively coupled to a second network to alter participation in the virtual collaborative event;

formulate a new topology based on at least one policy, wherein the topology creates and maintains virtual relationships among the at least one node communicatively coupled to a first network and the at least one node communicatively coupled to a second network;

communicate media stream assignments to at least one node affected by the new topology; and configure the affected at least one node to establish media streams according to the media stream assignments.

21. The system of claim 1, wherein the participant device comprises a distributor.

22. The system of claim 1, wherein the participant device comprises a node.

23. The system of claim 21, wherein the change to the mode of participation includes adding additional nodes to the virtual collaborative event via the distributor.

24. The system of claim 1, wherein the topology specifies participants and connections between participants in the virtual collaborative event.

* * * * *